United States Patent
Saito et al.

(10) Patent No.: US 6,281,299 B1
(45) Date of Patent: *Aug. 28, 2001

(54) MANUFACTURING METHOD FOR TRANSPARENT POLYESTER/POLYCARBONATE COMPOSITIONS

(75) Inventors: Akihiro Saito, Tochigi Prefecture; Takashi Nagai, Otake, both of (JP)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,500

(22) Filed: Sep. 30, 1998

(51) Int. Cl.$^7$ .............................. C08L 67/02; C08L 69/00
(52) U.S. Cl. .............................................. 525/439; 525/466
(58) Field of Search ....................................... 525/439, 466

(56) References Cited

U.S. PATENT DOCUMENTS

| | | |
|---|---|---|
| 4,001,184 | 1/1977 | Scott . |
| 4,238,569 | 12/1980 | Lim et al. . |
| 4,238,597 | 12/1980 | Markezich et al. . |
| 4,474,999 | 10/1984 | Mark et al. . |
| 5,026,817 | 6/1991 | Sakashita et al. . |
| 5,151,491 | 9/1992 | Sakashita et al. . |
| 5,187,242 | 2/1993 | Sakashita et al. . |

FOREIGN PATENT DOCUMENTS

| | | |
|---|---|---|
| 736 558 | 10/1996 | (EP) . |
| 2124934 | 5/1990 | (JP) . |
| 2175723 | 7/1990 | (JP) . |
| 3203956 | 9/1991 | (JP) . |
| 5239333 | 9/1993 | (JP) . |
| 95345685 | 12/1995 | (JP) . |
| 10-87969 | 4/1998 | (JP) . |

*Primary Examiner*—Patricia A. Short

(57) ABSTRACT

A manufacturing method for transparent polyester/polycarbonate compositions using equipment for manufacturing polycarbonates or polyesters by the melt polymerization method comprises a manufacturing method wherein polyester or polycarbonate resin is added to a polymerization vessel or to the outlet side of a polymerization vessel of polycarbonate or polyester manufacturing equipment, or a manufacturing method. The polyester or polycarbonate resin is added to a polymerization vessel in which the polymerization reaction is substantially complete, or to the outlet side of a polymerization vessel, or to the pelletization apparatus of the manufacturing equipment for polycarbonates or polyesters and provides high productivity for manufacturing transparent polyester/polycarbonate compositions with superior impact strength as well as solvent resistance.

13 Claims, 3 Drawing Sheets

MANUFACTURING METHOD FOR TRANSPARENT POLYESTER/POLYCARBONATE COMPOSITIONS

This invention relates to methods of manufacturing transparent polyester/polycarbonate compositions, in particular, methods of manufacturing transparent polyester/polycarbonate compositions using equipment for the manufacture of polycarbonates or polyesters by the melt polymerization method.

Polycarbonates have superior mechanical properties such as impact resistance, etc., and further, have superior heat resistance and transparency, and are widely used in applications such as various types of mechanical components, optical lenses and discs, automotive components, etc.

Polycarbonates such as these are traditionally manufactured using methods that react phosgene directly with aromatic dihydroxy compounds such as bisphenol A (interfacial methods) or methods based on ester interchange reactions of carbonate diesters with aromatic dihydroxy compounds in the melt phase, and are normally obtained as pellets, chips or powders.

However, it is desirable that polycarbonates having superior physical properties such as described above also offer further improvements in characteristics such as chemical resistance, moldability and impact strength dependent on thickness.

Accordingly, for many years, methods to improve chemical resistance and moldability by adding polyester to polycarbonate have been given trials.

For example, Publication of Unexamined Patent 5-239333 discloses a method that adds polybutylene terephthalate, ABS or polymethyl methacrylate, etc., during the manufacture of polycarbonates. However, in this method, the hue after mixing and kneading and mixing the base resin is improved, but the transparency and mechanical properties are not expressly stated.

In addition, polycarbonates have excellent mechanical strength, chemical resistance and gas barrier characteristics, and are widely used in applications such as bottles and films used for food products, tapes and fibers as well as automotive parts and various types of mechanical components that exploit its thermal resistance which results from crystallization.

The addition of polyethylene terephthalate (PET), polybutylene terephthalate (PBT), etc., to polycarbonates is also a well-known method intended to improve chemical resistance and gas barrier characteristics of polycarbonates, and has been commercialized.

Nevertheless, when polyester is kneaded and mixed into the polycarbonate using ordinary methods, the transparency—an outstanding feature of polycarbonates—suffers a significant decline. The inventors have proposed Japanese Patent Application No. 7-345685, "Transparent polyester/polycarbonate composition," as an improvement on this method. Polyester/polycarbonate compositions manufactured according to this method are transparent and maintain their transparency even at temperatures approaching the glass transition point, but there is a significant decline in the notched Izod impact strength compared to ordinary polycarbonates. Further, the cost rises because, during manufacture, the two resins are kneaded and mixed after both have been melted.

This invention is a method of manufacturing transparent polyester/polycarbonates in which, with respect to equipment using melt polymerization in the manufacture of one of a plural number of resins which are kneaded and mixed, directly adds another resin which is kneaded and mixed, specifically, a method of manufacturing transparent polyester/polycarbonates using manufacturing equipment for polycarbonates or polyesters by melt polymerization methods in which polyester or polycarbonate is added to the polymerization vessel, or to the outlet side of the polymerization vessel, of manufacturing equipment for polycarbonates or polyesters.

This invention also provides a manufacturing method for transparent polyester/polycarbonates comprising manufacturing polycarbonates or polyesters by melt polymerization methods in which polyester or polycarbonate resin is added to the polymerization vessel in which the polymerization reaction is substantially complete, or to the outlet side of the polymerization vessel, or to pelletization apparatus of manufacturing equipment for polycarbonates or polyesters.

In addition, the manufacturing method for transparent polyester/polycarbonates comprises adding specific additives together with the added polyester or polycarbonate in which preferably the ester interchange conversion percentage of the transparent polyester/polycarbonate is from about 1% to about 95%, the ratio by weight of the constituents in the polyester/polycarbonate composition is from about 45/55 to about 3/97, the polyester is polyethylene terephthalate, polybutylene terephthalate and/or polynaphthalene terephthalate, and the polycarbonate is a polycarbonate whose primary constituent is bisphenol A.

BRIEF DESCRIPTION OF THE DRAWINGS

FIG. 1 is an NMR chart of the composition manufactured in Example 2.

FIG. 2 is an NMR chart of the composition manufactured in Example 3.

FIG. 3 shows an enlargement of parts of the NMR charts of FIGS. 2 and 3

Figure 1:
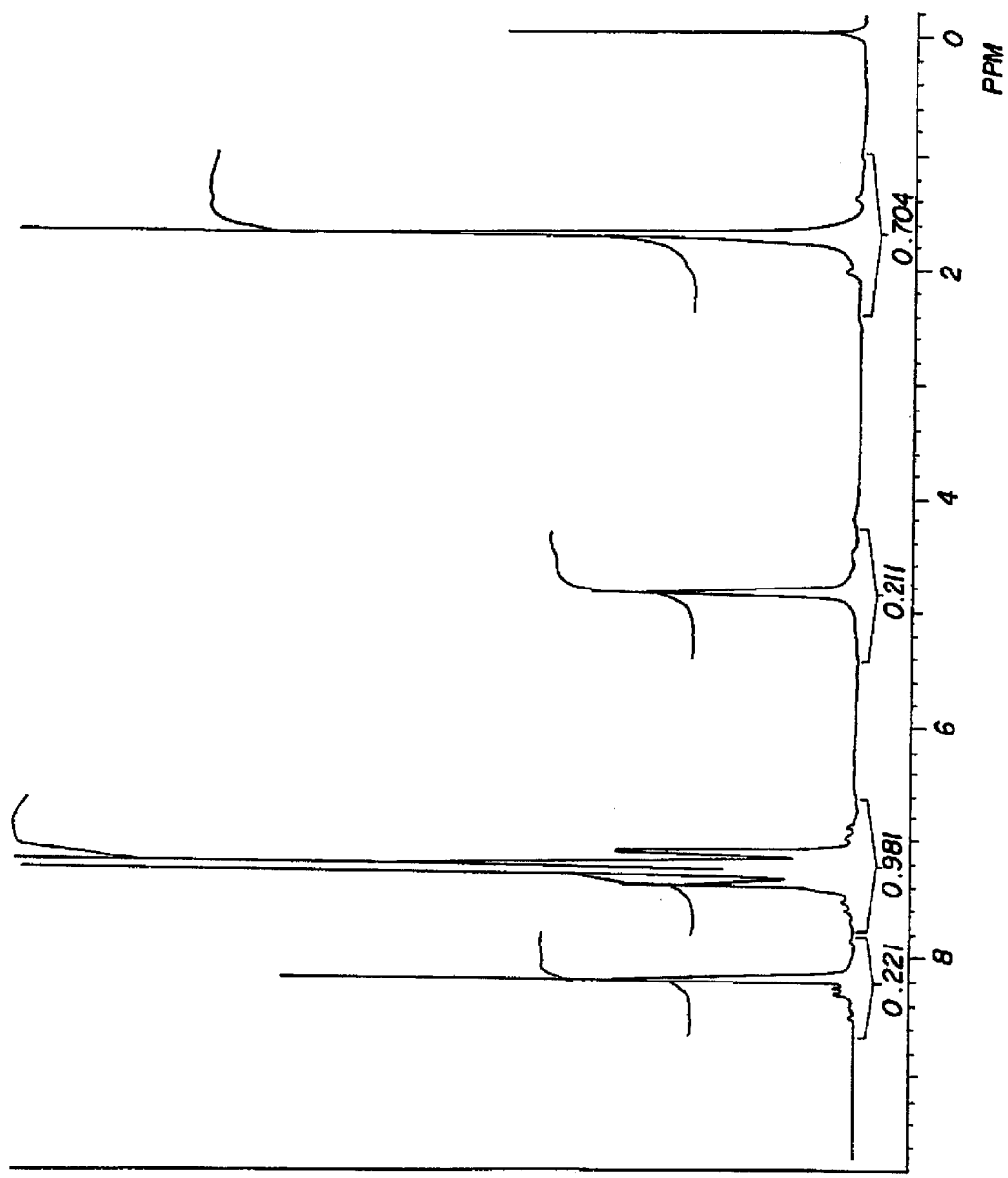
FIGS. 1–3 are NMR charts of compositions manufactured according to the method of the present invention.

It is acceptable for the equipment manufacturing the polyester or polycarbonate used in this invention by the melt polymerization method to be equipment having a single reactor or a multi-stage reactor of one or more reactors, and in addition, that the reaction configuration be a batch or continuous system. But, because the added resin may be introduced at any point, a multi-stage continuous system is preferable.

There are no particular restrictions on the form or materials of the reactor, and vertical or horizontal reactors are acceptable provided it is possible to manufacture polyester or polycarbonate in said equipment. In addition, it is preferable that material of the manufacturing equipment not cause the hue of the manufactured resin to deteriorate; for example, nickel or stainless steel are ideal. In the case of stainless steel, it is preferable that the interior surfaces be finished by an acid wash or buff polishing, and treated by plating with nickel, etc.

In addition, it is preferable that an extruder for the purpose of taking the molten resin so manufactured out of the reactor and pelletizing it be provided as an accessory.

In this invention, there are no particular restrictions on the point where the resin is added to said production equipment, and it is acceptable at any point and at any stage of the reaction. However, it is preferable to add it to the reactor at the stage when the reaction is complete or at the outlet side of the reactor, and in particular, at the pelletizing apparatus.

Adding the resin at the initial stage of the manufacturing equipment readily generates detrimental effects, such as an increase in the melt viscosity in said equipment, a decline in agitation efficiency, etc.

In addition, there are also no particular restrictions on the method of adding [the resin], but it is preferable to add it in the melt phase using a gear pump, etc., from the melting apparatus of the extruder, etc.

The polycarbonate used in this invention (constituent A) may be any polycarbonate, e.g., aliphatic or aromatic, but is preferably an aromatic polycarbonate manufactured by reacting a dihydric phenol with a carbonate precursor. In addition, the polycarbonate of this invention may be branched or linear. Branched polycarbonates can be obtained by reacting a polyfunctional aromatic compound with a dihydric phenol and a carbonate precursor to make a branched thermoplastic branched polycarbonate.

Methods of manufacturing polycarbonates are public knowledge per se. Methods that synthesize polycarbonates by bringing about an ester interchange reaction of a carbonate diester with a dihydric alcohol or phenol, preferably a phenol, in the melt phase, or methods that react phosgene with a dihydric phenol in a liquid solution are well known.

Japanese Publication of Unexamined Patent Application (Kokai) 2-175723, Japanese Publication of Unexamined Patent Application (Kokai) 2-124934, U.S. Pat. No. 4,001,184, U.S. Pat. No. 4,238,569, U.S. Pat. No. 4,238,597 and U.S. Pat. No. 4, 474,999 can be cited as examples.

There are no particular limitations on the aromatic hydroxyl compound and a variety of well known compounds having phenolic hydroxyl groups can be used. Such compounds, for example, have the general formula:

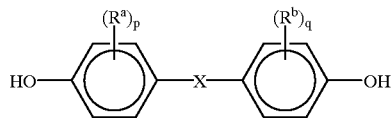

In the above-mentioned formula, $R^a$ and $R^b$ each independently may be a hydrogen atom, a halogen atom (for example, chlorine, bromine, fluorine, iodine) or an alkyl group having from 1 to 8 carbons atoms, and when there are a plural number of $R^a$'s and $R^b$'s, they may be identical or different; p and q each independently being an integer between 0 and 4. In addition, X represents a single bond, an alkylene group having from 1 to 8 carbon atoms, an alkylidene group having from 2 to 8 carbon atoms, a cycloalkylene group having from 5 to 15 carbon atoms, a cycloalkylidene having from 5 to 15 carbon atoms, or a —S—, —SO—, —SO$_2$—, —CO—, —O— bond, or a bond represented by the following general formula:

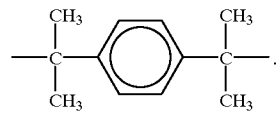

Dihydroxy arylalkanes such as bis-(4-hydroxyphenyl)-methane, 1,1-bis-(4-hydroxyphenyl)-ethane, 1,2-bis-(4-hydroxyphenyl)-ethane, bis-(4-hydroxyphenyl)-phenyl-methane, bis-(4-hydroxyphenyl)-diphenyl-methane, 2,2-bis-(4-hydroxyphenyl)-propane, 2,2-bis-(4-hydroxyphenyl)-butane, 1,1-bis-(4-hydroxyphenyl)-cyclohexane, bis-(3,5-dimethyl-4-hydroxyphenyl)-methane, 1,1-bis-(3,5-dimethyl-4-hydroxyphenyl)-ethane, 1,2-bis-(3,5-dimethyl-4-hydroxyphenyl)-ethane, 2,2-bis-(3,5-dimethyl-4-hydroxyphenyl)-propane, 2,2-bis-(3,5-dimethyl-4-hydroxyphenyl)-butane, bis-(3,5-dimethyl-4-hydroxyphenyl)-phenyl-methane, bis-(3,5-dimethyl-4-hydroxyphenyl)-diphenyl-methane, bis-(3,5-dichloro-4-hydroxyphenyl)-methane, 2,2-bis-(3,5-dichloro-4-hydroxyphenyl)-propane, bis-(3,5-dibromo-4-hydroxyphenyl)-methane, 2,2-bis-(3,5-dibromo-4-hydroxyphenyl)-propane, etc.; dihydroxy arylsulfones such as bis-(4-hydroxyphenyl)-sulfone, bis-(3,5-dimethyl-4-hydroxyphenyl)-sulfone, bis-(3,5-dibromo-4-hydroxyphenyl)-sulfone, etc.; dihydroxy arylethers such as bis-(4-hydroxyphenyl)-ether, bis-(3,5-dimethyl-4-hydroxyphenyl)-ether, bis-(3,5-dibromo-4-hydroxyphenyl)-ether, etc.; dihydroxy arylsulfides such as bis-(4-hydroxyphenyl)-sulfide, bis-(3,5 -dimethyl-4-hydroxyphenyl)-sulfide, bis-(3,5-dibromo-4-hydroxyphenyl)-sulfide, etc.; dihydroxy arylketones such as 4,4'-dihydroxybenzophenone, etc.; or sulfoxides such as bis-(4-hydroxyphenyl)-sulfoxide, etc., can be cited as dihydric phenols.

Among these, 2,2-bis-(4-hydroxyphenyl)-propane is preferable. Other than those mentioned above, compounds represented by the following general formula:

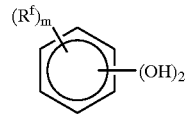

wherein, $R^f$ is a hydrocarbon group having from 1 to 10 carbon atoms or its halogenide, or a halogen atom, m being an integer from 0 to 4, for example, resorcin as well as substituted resorcins such as 4-methyl-resorcinol, 4-ethyl-resorcinol, 4-propyl-resorcinol, 4-butyl-resorcinol, 4-t-butyl-resorcinol, 3-phenyl-resorcinol, 4-cumyl-resorcinol, 2,3,4,6-tetrafluoro-resorcinol, 2,3,4,6-tetrabromo-resorcinol, etc.; catechol; hydroquinone as well as substituted hydroquinones such as 3-methyl-hydroquinone, 3-ethyl-hydroquinone, 3-propyl-hydroquinone, 3-butyl-hydroquinone, 3-t-butyl-hydroquinone, 3-phenyl-hydroquinone, 3-cumyl-hydroquinone, 2,3,5,6-tetramethyl-hydroquinone, 2,5-di-t-butyl-hydroquinone, 2,3,5,6-tetrafluoro-hydroquinone, 2,3,5,6-tetrabromo-hydroquinone, etc.; as well as 2,2,2',2'-tetrahydro-3,3,3',3'-tetramethyl-1,1'-spirobis-(1H-indene)-7,7'-diol, represented by the following formula:

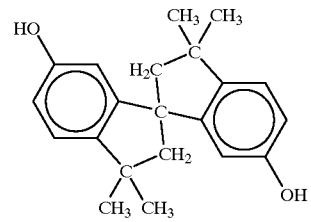

can be used as the aromatic dihydroxy compound.

It is acceptable to use these aromatic dihydroxy compounds alone, or it is acceptable to use two or more compounds in combination.

When manufacturing an aromatic polycarbonate, a polyfunctional compound having at least three functional groups in the molecule can be used together with an aromatic dihydroxyl compound and a carbonate diester. It is preferable that these polyfunctional compounds be compounds having a phenolic hydroxyl group or a carboxyl group. In particular, compounds containing three phenolic hydroxyl groups are preferred.

As specific examples of these preferred compounds, 1,1, 1-tris-(4-hydroxyphenyl)-ethane, 2,2',2"-tris-(4-hydroxyphenyl)-diisopropylbenzene, a-methyl-a,a',a"-tris-(4-hydroxyphenyl)-1,4-diethylbenzene, a,a',a"-tris-(4-hydroxyphenyl)-1,3,5-triisopropylbenzene, flouroglycine, 4,6-methyl-2,4,6-tri-(4-hydroxyphenyl)-heptane-2,1,3,5-tri-(4-hydroxyphenyl)-benzene, 2,2-bis-(4,4-(4,4'-dihydroxyphenyl)-cyclohexyl)-propane, trimellitic acid, 1,3, 5-benzene-tricarboxylic acid, pyromellitic acid, etc., can be cited.

Further, it is preferable that 1,1,1-tris-(4-hydroxyphenyl)-ethane, a,a',a"-tris-(4-hydroxyphenyl)-1,3,5-triisopropylbenzene, etc., be used.

It is preferable that the polyfunctional compound be used in an amount of less than about 0.03 mole per mole of aromatic dihydroxy compound, more preferable that it be from about 0.001 to about 0.02 mole, and especially preferable that it be from about 0.01 to about 0.02 mole.

Because the polycarbonates used in this invention promote the reaction with the polyester, it is preferable to have hydroxyl groups as end groups, particularly, phenolic hydroxyl groups. It is acceptable for the terminal phenolic hydroxyl groups to be at least about 10%, preferably at least about 20%, more preferably at least about 30%, and especially preferable that they be at least about 40% of the total end groups.

In particular, the amount of terminal hydroxy groups on the polycarbonate becomes critical when the addition point is the reactor in which the resin manufacturing reaction in said equipment has substantially ended, or the pelletizing apparatus.

The polyester (constituent B) are polyesters of diols (or derivatives formed from their esters) or dicarboxylic acids (or derivatives formed from their esters), and it is acceptable to use the following compounds individually or in combination together with the diol constituent [and/or] dicarboxylic acid constituent.

Aliphatic diols having from 2 to 15 carbon atoms such as ethylene glycol, 1,2-propylene glycol, 1,3-propylene glycol, 1,4-butanediol, 2,3-butanediol, 1,6-hexanediol, 1,8-octanediol, neopentyl glycol, 1,10-decanediol, diethylene glycol, triethylene glycol, etc., can be cited as diol constituents. Preferred aliphatic diols are ethylene glycol and 1,4-butanediol.

In addition, 1,2-cyclohexanediol, 1,4-cyclohexanediol, 1,4-cyclohexane dimethanol, etc., can also be cited. These alicyclic diols can be used in either cis or trans configuration, or a mixture of both can be used. The preferred aliphatic diol is 1,4-cyclohexane dimethanol.

Further, aliphatic dihydric phenols such as resorcin, hydroquinone, naphthalenediol, etc.; polyglycols such as polyethylene glycol, polypropylene glycol, and polytetramethylene glycol, etc., having a molecular weight of from about 400 to about 6,000; and bisphenols cited in Japanese Unexamined Patent Application No. 3-203956 such as bisphenol A can also be cited.

Aromatic dicarboxylic acids such as isophthalic acid, terephthalic acid, orthophthalic acid 2,2'-biphenyl-dicarboxylic acid, 3,3'-biphenyl-dicarboxylic acid, 4,4'-biphenyl-dicarboxylic acid, 4,4'-diphenylether-dicarboxylic acid, 1,5-naphthalene-dicarboxylic acid, 1,4-naphthalene-dicarboxylic acid, 2,6-naphthalene-dicarboxylic acid, etc., and aliphatic as well as alicyclic dicarboxylic acids such as adipic acid, succinic acid, oxalic acid, malonic acid, suberic acid, azelaic acid, sebacic acid, decanedicarboxylic acid, cyclohexane-dicarboxylic acid, etc., can be cited as dicarboxylic acid constituents. Preferred dicarboxylic acids are terephthalic acid and naphthalene-dicarboxylic acids.

It is acceptable to use these respective diols and dicarboxylic acids alone, or it is acceptable to use two or more diols or dicarboxylic acids in combination as constituent B. In addition, the obtained polyesters may be used alone or may be used in combination.

The polyester compounds are polyesters of an aromatic dicarboxylic acid and an alkylene glycol. Specifically, polyethylene terephthalate, polybutylene terephthalate, polyethylene naphthalate, poly-1,4-cyclohexylene-methylene terephthalate, the copolyester of poly-(1,4-cyclohexylene-methylene terephthalate-co-isophthalate), poly(ethylene-co-1,4,-cyclohexylene-methylene terephthalate), etc., can be cited. Among these, polyethylene terephthalate and/or polybutylene terephthalate are especially preferred.

It is acceptable for the composition ratio A/B of the polycarbonate (constituent A) to the polyester (constituent B) in the transparent polyester/polycarbonates manufactured using this invention to be from about 55/45 to about 97/3, preferable that it be from about 60/40 to about 95/5, more preferable that it be from about 70/30 to about 90/10, and especially preferable that it be from about 75/25 to about 80/20.

The ester interchange rate of the polycarbonate and the polyester in the transparent polyester/polycarbonate is directly related to various physical properties such as impact strength, glass transition temperature, etc. In other words, the higher the ester interchange rate, the better the impact strength, and at about 5% and above, the notched Izod impact strength improves from brittle to ductile.

Further, the physical properties will vary according to the rise in interchange rate, and at interchange rates of less than about 50%, fluidity is excellent, and at about 50% and above, the glass transition temperature also increases approximately 10° C. whether the polyester/polycarbonate composition ratio is the same or not.

On the other hand, solvent resistance declines as the interchange rate increases. In this manner, the physical properties can be optimized to match the usage application by controlling the ester interchange rate.

Consequently, the ester interchange rate can be regulated by adjusting the point at which it is added to the manufacturing equipment and the timing of the addition, making it possible to manufacture transparent polyester/polycarbonates having physical properties matched to the usage objective.

Further, it is possible to add ester interchange reaction catalysts and/or stabilizers and control the same reaction ratio.

In such a way, transparent polyester/polycarbonates can be obtained in compositions having physical properties matched to usage objectives by varying the ester interchange rate, and this is extremely useful industrially.

For example, to improve the Izod impact strength, it is acceptable that the ester interchange rate of the polycarbonate and polyester be at least about 5%, preferable that it be at least about 8%, more preferable that it be about 10%, and even more preferable that it be at least about 15%.

For the sake of fluidity improvements, it is acceptable for the ester interchange rate to be less than about 50%, preferable that it be from about 1% to about 45%, more preferable that it be from about 3% to about 40%, and even more preferable that it be from about 5% to about 35%. In particular, provided that the lower limit is at least about 5%, fluidity can also be improved along with impact strength.

To improve thermal resistance, it is acceptable that the ester interchange rate be at least about 50%, preferable that it be at least about 55%, more preferable that it be at least about 60%, and still more preferable that it be at least about 65%.

On the other hand, the lower the ester interchange rate, the better the solvent resistance (ESCR, i.e., environmental stress crack resistance), and it is acceptable that the ester interchange rate be less than about 95%, preferable that it be less than about 80%, more preferable that it be less than about 50%, and still more preferable that it be less than about 30%.

If the usage objective is transparency and the impact strength, fluidity and ESCR are in an acceptable range, it is appropriate that the ester interchange rate be from about 5% to about 50%. In addition, in applications that demand impact strength and thermal resistance with transparency, an ester interchange rate of at least about 50% is suitable, and from about 60% to about 90% is preferable.

As specific additives to be added, various types of catalysts and/or stabilizing agents and stabilizers exist to promote the ester interchange reaction.

Well-known catalysts can be used as ester interchange catalysts. Tin compounds such as dibutyl tin oxide, stannic oxalate, stannic acetate, stannic oxide, etc., titanium compounds such as tetrabutoxytitanium, tetraphenoxytitanium*, titanium oxide, titanium oxalate, etc., antimony compounds such as antimony trioxide, antimonyl oxytartrate*, etc., zinc compounds such as zinc acetate, zinc stearate, zinc acetylacetone, etc., boric acid compounds such as triphenoxy boron, zinc borate, etc., magnesium oxide, germanium compounds such as germanium ethoxide, etc., can be cited as Lewis acid catalysts.

In addition, organic basic compounds as well as alkalis and alkaline earth metals, etc., can be cited as basic catalysts. Examples of basic compound catalysts are given as follows.

Nitrogen-containing basic compounds, for example, ammonium hydroxides that have alkyl, aryl, etc., groups such as tetramethyl ammonium hydroxide, tetraethyl ammonium hydroxide, tetrabutyl ammonium hydroxide, tetraphenyl ammonium hydroxide, etc., as well as the salts of acids weaker than about pKa 4, etc., can be cited as organic basic compounds.

In addition, ternary amines represented by the general formula, $NR_3$ (in the formula, R is an alkyl, aryl, etc., group having from 1 to 25 carbon atoms such as methyl, ethyl, phenyl, benzyl, toluyl, etc.) such as trimethylamine, triethylamine, trioctylamine, triphenylamine, dibenzylmethylamine, etc.; secondary amines as well as primary amines given by $NHR_2$ and $NH_2R$ (in the formula, R is the same as that described above); as well as pyridine, methylpyridine, methoxypyridine, quinoline, imidazole and ammonia can be cited as nitrogen-containing basic compounds other than those described above. Further, tetra-alkyl and tetra-aryl phosphonium hydroxides such as tetrabutyl phosphonium hydroxide, etc., can be cited.

Inorganic compounds such as the hydroxides, hydrides, amides, carbonates, phosphates, borates, etc., of alkali metals such as sodium, potassium, lithium, cesium, etc., and of alkaline earth metals such as calcium, magnesium, barium, etc., can be cited as examples of alkali or alkaline earth metal compounds.

Further, the carbonates of alkali metals such as sodium, potassium, lithium, cesium, etc., and of alkaline earth metals such as calcium, magnesium, barium, etc., the salts of phenolic hydroxides, and the salts of alcoholic hydroxides can be cited as salts of organic acids.

In addition, compounds with acetylacetone and crown ether, etc., can be cited.

The amount of ester interchange reaction catalyst to add with respect to the total amount of constituents (A) and (B) is, in the case of Lewis acid catalysts, preferably in the range of from about 1 to about 10,000 ppm, and more preferably from about 10 to about 1,000 ppm, and in the case of basic catalysts, preferably from about 0.01 to about 1,000 ppm, more preferably from about 0.05 to about 100 ppm and still more preferably from about 0.1 to about 50 ppm.

In addition, Lewis acid catalysts and basic catalysts may be used simultaneously, and in this case, the amount of each catalyst used can be decreased compared to the case of using each alone.

Depending on the above-mentioned ranges, no additive effect will be apparent when the amount of catalyst is small, and in addition, when the amount is large, it will lead to a drop in the molecular weight during mold forming and the physical properties will deteriorate.

Proton acids and esters or salts thereof can be cited as stabilizing agents. Specific examples are given below, but are not limited to the cited examples, and it is acceptable to use acids, esters and/or salts alone, or to use two or more compounds in a mixture.

A wide variety of acids having a pKa of less than about 6 can be cited as proton acids.

Phenols having an electron attracting group as a substituent such as 2,4-dinitrophenol, 2,4,6-trinitrophenol, etc., carboxylic acids such as formic acid, methoxyacetic acid, acetic acid, butyric acid, citric acid, malic acid, etc., carboxylic acids having an electron attracting group in the a position such as trifluoroacetic acid, trichloroacetic acid, 1,1-difluoroproprionic acid, monochloroacetic acid, dichloroacetic acid, monofluoroacetic acid, nitroacetic acid, cyanoacetic acid, etc., aromatic carboxylic acids having an electron attracting group as a substituent such as m-nitrobenzoic acid, 2,4-dinitrobenzoic acid, 2,4,6-trinitrobenzoic acid, etc., dicarboxylic acids such as oxalic acid, 2-carboxypropionic acid, malonic acid, succinic acid, fumaric acid, maleic acid, etc., aromatic dicarboxylic acids such as phthalic acid, isophthalic acid, terephthalic acid, 1,3-naphthalene-dicarboxylic acid, etc., inorganic acids such as boric acid, hydrobromic acid, nitric acid, iodic acid, perchloric acid, periodic acid, bromic acid, sulfuric acid, etc., sulfonic acids such as benzenesulfonic acid, p-toluenesulfonic acid, naphthalenesulfonic acid, methylsulfonic acid, fluorosulfonic acid, etc., and phosphoric acids such as phosphoric acid, phosphorous acid, hypophosphorous acid, pyrophosphoric acid, metaphosphoric acid, polyphosphoric acid, etc., can be cited as examples.

Alkyl and/or aryl esters of the above-mentioned proton acids can be cited as ester derivatives. In particular, esters of sulfonic acid such as methyl benzenesulfonate, ethyl benzenesulfonate, butyl benzenesulfonate, butyl p-toluenesulfonate, phenyl p-toluenesulfonate, butyl naphthalensesulfonate, butyl methylsulfonate, etc., and mono- and tri-esters of phosphoric acid as well as diesters of sulfuric acid such as (2,4-ditertiary-butyl-phenyl) monophosphate, (2,4-ditertiary-butyl-phenyl) diphosphate, (noryl-phenyl) triphosphate, monophenyl phosphate, dimethyl phosphate, tri-(2,4-dimethyl-phenyl) phosphate, and diethyl phosphite, etc., can be cited.

In addition, monosodium carbonate, monosodium phosphate, disodium phosphate, monopotassium phosphate, dilithium phosphate, magnesium phosphate, zinc phosphate, zinc monophosphate, monosodium phosphite, disodium phosphite, monopotassium phosphite, dilithium phosphite, calcium phosphite, monosodium oxalate, monopotassium phthalate, sodium borate, ammonium sulfonate, ammonium p-toluenesulfonate, monopotassium sulfate, etc., can be cited as examples of basic compounds.

Basic compounds may be partially esterified compounds and partially metallic salts of dibasic acids, tribasic acids, etc., and these basic compounds may be used alone or added in mixtures.

When no amount of catalyst is added, it is acceptable that no amount of stabilizer be added. However, it is preferable to add about 0.002 parts by weight of stabilizer to 100 parts by weight of resin composition to improve thermal stability. When a catalyst is added, it is acceptable to add an amount of stabilizer from about 0.00001% to about 3% of the total of constituent (A) and constituent (B), and it is preferable to use from about 0.0001% to about 1%, more preferable to use from about 0.001% to about 0.5%, and especially preferable to use from about 0.01% to about 0.1.

Adding stabilizers or stabilizing agents in amounts greater than about 3% has a detrimental effect on the resin constituents during pelletization and mold forming, and it is preferable that there be no decline in mechanical strength.

Phosphorous-containing compounds such as Irgafos 168 (trademarked product of Ciba-Geigy Corporation), Chelex L (trademarked product of Sakai Chemical Industry Co., Ltd.), 3P2S (trademarked product of Ihara Chemical Industry Co., Ltd.), Mark 329K (trademarked product of Asahi Denka Kogyo, K.K.), Mark P (trademarked product of Asahi Denka Kogyo, K.K.), Weston 618 (trademarked product of Sanko Kagaku, K.K.), etc., hindered phenols such as BHT (trademarked product of Takeda Chemical Industries, Ltd.), Ionox 100 (trademarked product of Shell Chemical), Age Rite Superlite (trademarked product of R.T. Vanderbilt Company), Santonox R (trademarked product of Monsanto, Inc.), Antioxidant ZKF (trademarked product of Bayer Corporation), Irganox 1076 (trademarked product of Ciba-Geigy Corporation), HYoechst VP0SPI (trademarked product of Hoechst), Irganox 1010 (trademarked product of Ciba-Geigy Corporation), etc., triazoles such as Cyasorb UV-5411 (trademarked product of A.C.C.), Cyasorb UV-531 (trademarked product of A.C.C.), Tinuvin 326 (trademarked product of Ciba-Geigy Corporation), Tinuvin 320 (trademarked product of Ciba-Geigy Corporation), Tinuvin 120 (trademarked product of Ciba-Geigy Corporation), Uvinul D49 (trademarked product of GAF Corporation), etc., as well as other epoxies, thiols, metallic salts, etc., can be cited as stabilizers. There are no particular restrictions of the amount of these stabilizers to add, and any of these stabilizers may be combined.

It is also acceptable to add various types of additives within a range that does not hinder the object of this invention. For example, phosphorous esters and/or halogens such as TPP (triphenyl phosphite), RDP {resorcinol bis (diphenyl phosphate)} (Oya Kagaku Kogyo, K.K.), etc., brominated BPA, brominated BPA carbonate as well as similar oligomers, etc., and inorganic flame retardants and flame retardant auxilliaries can be cited as examples of flame retardants. Antimony trioxide, magnesium hydroxide, calcium hydroxide, etc., can also be cited as examples. Other colorants such as pigments, dyes, etc., mold release agents, fiber reinforcing agents, lubricants, plasticizers, anti-static agents, etc., may also be added.

This invention will be explained using the examples below, but these are examples only, and can be modified as desired within the scope of this invention.

EXAMPLE 1

0.440 kilomole of bisphenol A and 0.460 kilomole of diphenyl carbonate were placed in a 250-liter reactor, and after evacuation and replacement with nitrogen, were melted by heating to 140° C. After initiating agitation of the reactor, the temperature was raised to 180° C. and 0.11 mole of tetramethyl ammonia and 0.00044 mole of sodium hydroxide were added. The temperature was raised to 240° C. together with reducing the pressure to 20 mm Hg, and the mixture was reacted for two hours while distilling off the phenol. At this point, the intrinsic viscosity of the reaction product measured at 25° C. in chloroform was 0.14 dl/g. Next, it was reacted by conveying the reaction solution to a centrifugal thin-film evaporator [held at] 295° C. at 2 mm Hg at 40 kg/h. The intrinsic viscosity of the reaction product at this point was 0.36. It was then conveyed to a biaxial horizontal-agitation polymerizer (L/D=6, diameter of agitation vanes=150 mm, internal capacity=40 liters) held at 290° C. and 0.2 mm Hg, and reacted for 30 minutes. The intrinsic viscosity of the reaction product was 0.5 at this point. 10 kg/h of polyester terephthalate (Mitsui PET J120 manufactured by Mitsui Petrochemical Industries, Ltd.) was side fed into a biaxial extruder on the outlet side of the horizontal polymerizer, yielding a pelletized composition. The obtained composition had a polyethylene terephthalate/polycarbonate weight ratio of 20/80 and was transparent with a haze of 1.4%. The ester interchange ratio of polyethylene terephthalate and polycarbonate was 2% as measured by NMR. Table 1 shows the physical properties.

EXAMPLE 2

Other than changing the amount of diphenyl carbonate to 0.414 kilomole, polymerization was carried out under conditions identical to Example 1. The obtained polymer had an intrinsic viscosity of 0.50 dl/g, and the ratio of phenolic end groups to non-phenolic end groups was 9/1. In a manner similar to Example 1, 10 kg/h of polyethylene terephthalate and 1.85 ml/h of a 1% aqueous solution of sodium hydroxide was side fed into a biaxial extruder on the outlet side of the horizontal polymerizer, yielding a pelletized composition. The obtained composition had a polyethylene terephthalate/polycarbonate weight ratio of 20/80 and was transparent with a haze of 1.3%. The ester interchange rate of the polyethylene terephthalate and polycarbonate as measured by NMR was 15%. Table 1 shows the physical properties.

EXAMPLE 3

Polymerization was carried out under conditions identical to Example 2, and the polyethylene terephthalate was fed directly into the horizontal polymerizer at the rate of 10 kg/h. The obtained composition had a polyethylene terephthalate/polycarbonate weight ratio of 19/81 and was transparent with a haze of 1.3%. The ester interchange rate of polyethylene terephthalate and polycarbonate measured by NMR was 84%. Table 1 shows the physical properties.

COMPARATIVE EXAMPLE 1

2 kg of polyethylene terephthalate and 8 kg of polycarbonate were dry-blended followed by melt mixing and kneading in a uniaxial extruder. The obtained composition was opaque with a haze of 30%, and the ester interchange rate as measured by NMR was zero. Table 1 shows the physical properties.

COMPARATIVE EXAMPLE 2

1 kg of polyethylene terephthalate and 9 kg of polycarbonate as well as 0.0035 g of sodium hydroxide were dry-blended and melt mixed and kneaded under conditions identical to Comparative Example 1. The obtained composition was transparent with a haze of 1.6%, and the ester interchange rate measured by NMR was negligible (less than 0.5%). Table 1 shows the physical properties.

Molding and physical property measurement methods are given below.

Injection Molding

A test sheet was prepared using a model PS 60 injection molding machine manufactured by Nissei Plastic Industrial Co., Ltd. to mold a dried sample.

Molding conditions—Cylinder temperature: 270° C., mold temperature: 80° C.

Ester Interchange Rate

Figure 2:
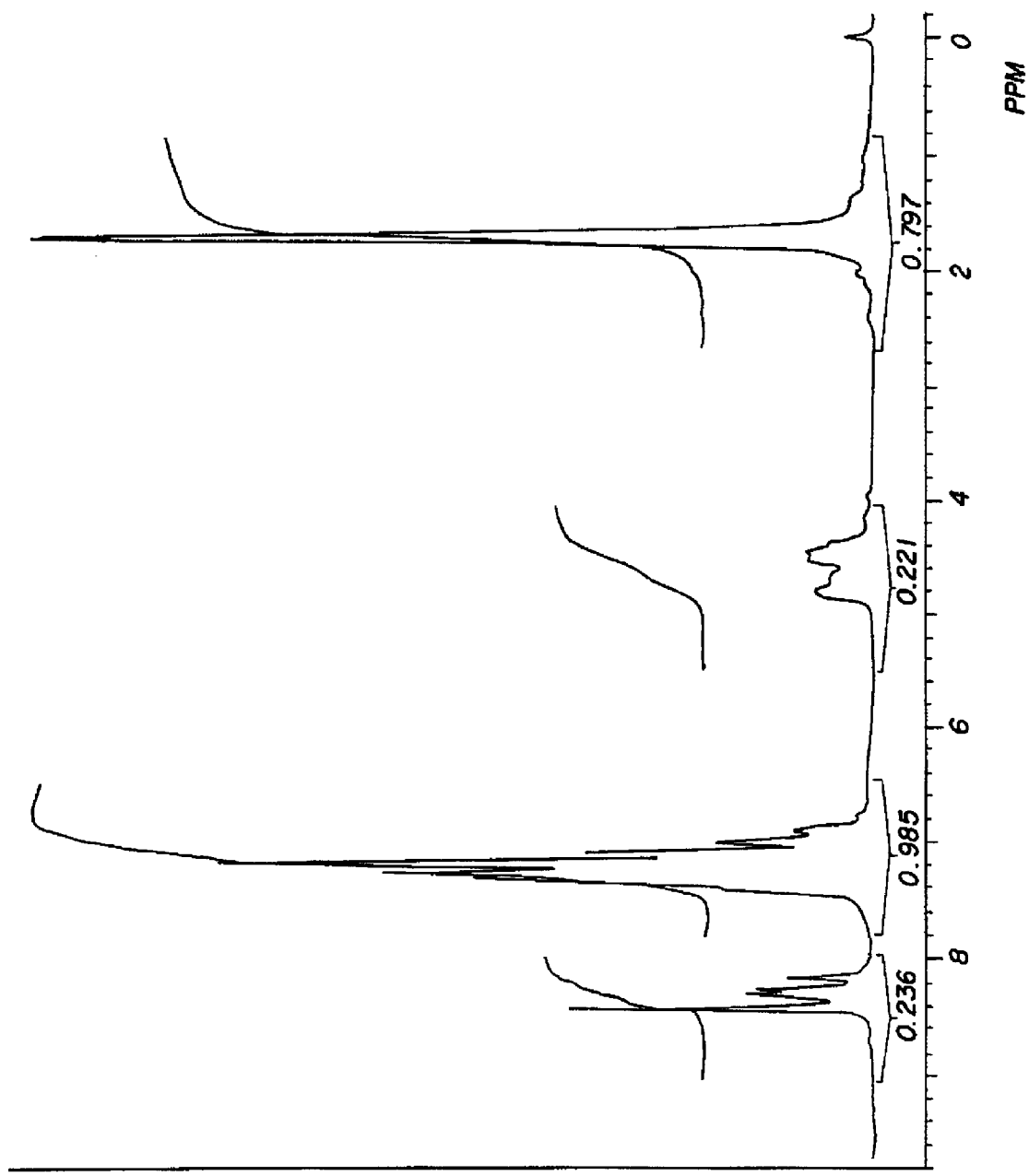

Measured by a model R-1900 FT-NMR apparatus manufactured by Hitachi, Ltd., by dissolving the mixed and kneaded polycarbonate and polyester composition in a 1/1 solvent mix of deuterated chloroform/trifluoroacetic acid (refer to FIGS. 1 and 2). The ester interchange reaction rate was found by the following formula from the aromatic ring derived from tetramethylsilane (0 ppm) in 8 to 9 ppm of terephthalic acid as a reference.

Ester interchange rate (%)=integral of 8.39 ppm+integral of 8.29 ppm and 8.24 ppm/integral of 8.1 to 8.5 ppm×100

Figure 3:
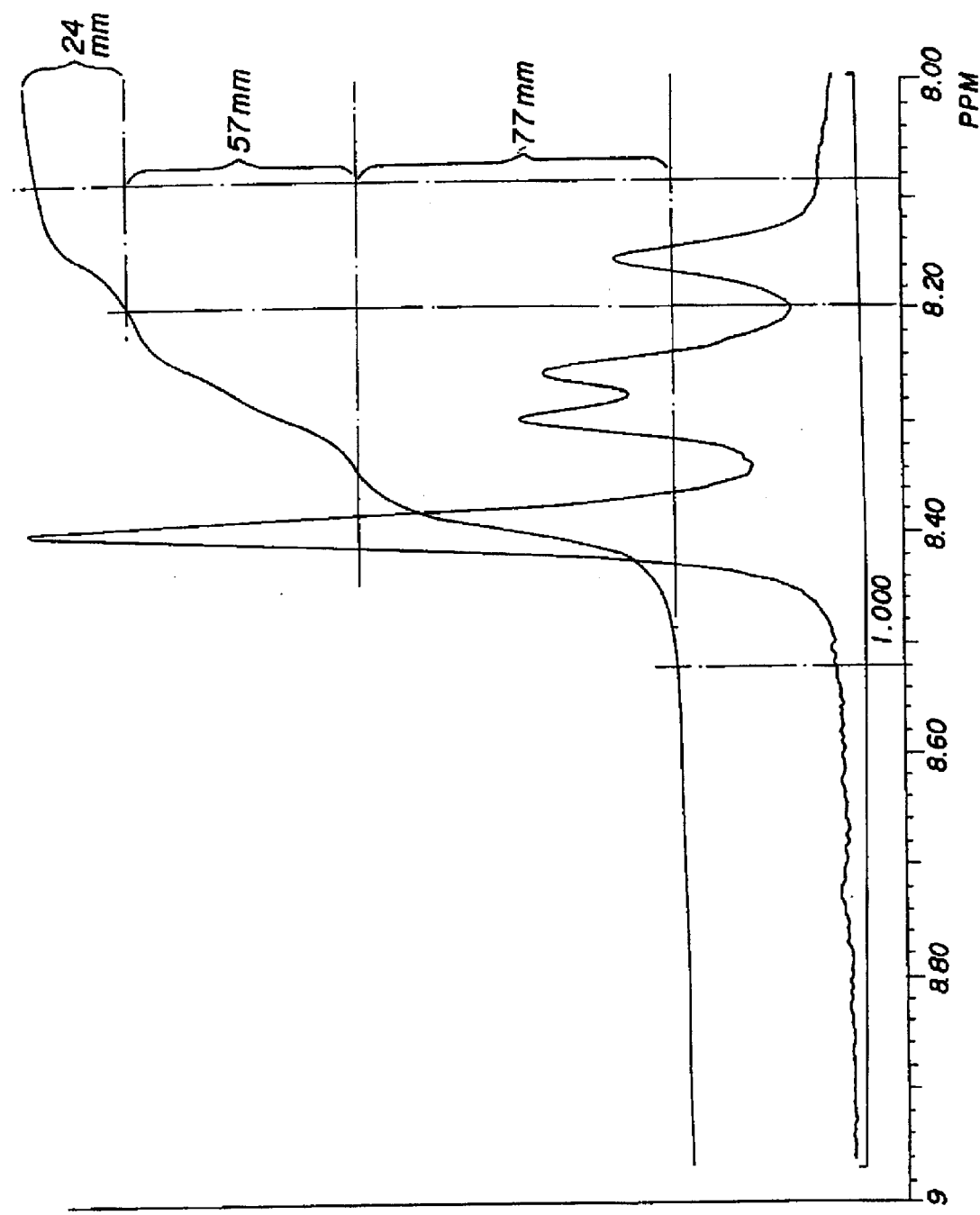

FIG. 1 shows an interchange rate of 15% for the composition of Example 2. FIGS. 2 and 3 show an interchange rate of 85% for the composition of Example 3. Interchange rate= 77+57/77+57+24 Interpreted from integrals in FIG. 3.

Haze

The haze of the extruded panel (thickness=3 mm) was measured using a model NDH-200 manufactured by Nippon Denshoku Kogyo, K.K.

Solvent Resistance (ESCR)

An extruded test piece (thickness=3.2 mm) was secured in 1% distortion jig and immersed in an aqueous solution of 1% detergent at 85° C. for one hour. The sample was then inspected and evaluated visually.

Evaluation ○ No change ⊘ Crazing occurred

Izod Impact Strength

Test was performed on a test piece having a thickness of 3.2 mm based on ASTM standard D256.

Spiral

Injection molding machine: PLASTAR Ti-80G2 manufactured by Toyo Machinery & Metal Co., Ltd.

Cylinder temperatures at the nozzle, C4, C3, C2, and C1 were 280°, 280°, 280°, 280° and 280° C., respectively.

Die temperature: 80° C.

Injection pressure: 1,000 kg/cm$^2$

TABLE 1

Measurement results of examples and comparative examples

| | Haze (%) | Tensile Strength (kg/cm$^2$) | Elongation (%) | Bending Strength (kg/cm$^2$) | Modulus elasticity (kg/cm$^2$) | Izod of Impact Strength (kg-cm/cm) |
|---|---|---|---|---|---|---|
| Example 1 | 1.4 | 710 | 210 | 950 | 24,500 | 13 |
| Example 2 | 1.3 | 680 | 230 | 940 | 24,100 | 85 |
| Example 3 | 1.3 | 680 | 190 | 960 | 23,900 | 86 |
| Comparative Example 1 | 30 | 660 | 220 | 990 | 24,300 | 8 |
| Comparative Example 2 | 1.6 | 670 | 210 | 1,000 | 24,200 | 7 |

Changes in physical characteristics based on their ester interchange rate are shown in the table below.

TABLE 2

Changes in physical characteristics according to ester interchange rate (PC/PET #145/J120 80/20)

| | Conversion rate (%) | ESCR | Spiral (cm) | $T_g$ (° C.) |
|---|---|---|---|---|
| Example 2 | 15 | ○ | 84 | 125 |
| Example 3 | 84 | ⊘ | 76 | 136 |
| Comparative Example 1 | <0.5 | ○ | 73 | 149/79 |

This invention makes it possible to readily manufacture transparent polyester/polycarbonates using manufacturing equipment for polyester or polycarbonate through the addition of polycarbonate or polyester resin, and can manufacture transparent polyester/polycarbonates having physical properties suitable for the usage objective by making it possible to control the ester interchange reaction of the polycarbonate with the polyester through the addition of specific additives and/or simultaneously with the addition point.

We claim:

1. An improved manufacturing method comprising making a transparent polyester/polycarbonate composition by the melt polymerization method in a polymerization vessel having an outlet wherein the improvement comprises melt polymerizing a polyester or polycarbonate in a polymerization vessel and adding a polyester resin or polycarbonate resin to the polyester or polycarbonate in the polymerization vessel when substantially polymerized or to the polyester or polycarbonate at the outlet of the polymerization vessel whereby a transparent polyester/polycarbonate composition is obtained, wherein the ester interchange reaction rate of the transparent polyester/polycarbonate composition is from about 50% to about 95%, and wherein an ester interchange catalyst is added to promote the ester interchange reaction.

2. A manufacturing method for making a transparent polyester/polycarbonate composition comprising melt polymerizing a polycarbonate resin or a polyester resin in a polymerization vessel having an outlet, pelletizing the melt polymerized polycarbonate resin or polyester resin in a pelletization apparatus and adding a polyester resin or a polycarbonate resin to the polycarbonate resin or polyester resin in the polymerization vessel when substantially completely melt polymerized or to the polycarbonate resin or polyester resin in the outlet of the polymerization vessel or to the polycarbonate resin or polyester resin in the pelletization apparatus before pelletization, wherein the ester interchange reaction rate of the transparent polyester/polycarbonate composition is from about 50 to about 95%, and wherein an ester interchange catalyst is added to promote the ester interchange reaction.

3. The method of claim 2 wherein an additive is added together with the added polyester or polycarbonate.

4. The method of claim 3 wherein the additive is selected from
   (i) an inorganic and/or organic compound of groups Ia, IIa, IVa, IIb, IVb or Va of the periodic table of elements, or a nitrogen-containing organic basic compound;
   (ii) an acid or sulfur-containing acidic compound of pKa less than about 6 and/or a derivative or salt formed from said acidic compound; or,
   (iii) a stabilizer.

5. The method of claim 2 wherein the ratio by weight of the constituents of the transparent polyester/polycarbonate composition is from about 45/55 to about 3/97.

6. The method of claim 2 wherein the polyester is polyethylene terephthalate. polybutylene terephthalate or polynaphthalene terephthalate.

7. The method of claim 2 wherein the polycarbonate is an aromatic polycarbonate.

8. The method of claim 7 wherein the primary constituent of the aromatic polycarbonate is bisphenol A.

9. The method claim 2 the resin manufactured in the manufacturing equipment is a polycarbonate and the added resin is a polyester.

10. A manufacturing method for making a transparent polyester/polycarbonate composition comprising melt polymerizing an aromatic polycarbonate resin in a polymerization vessel having all outlet, pelletizing the melt polymerized polycarbonate resin in a pelletization apparatus and adding a polyester resin selected from polyethylene terephthalate, polybutylene terephthalate or polynaphthalene terephthalate to the polycarbonate resin in the polymerization vessel when substantially completely melt polymerized or to the polycarbonate resin in the outlet of the polymerization vessel or to the polycarbonate resin in the pelletization apparatus before pelletization, wherein the ester interchange reaction rate of the transparent polyester/polycarbonate composition is from about 50% to about 95%, and wherein an ester interchange catalyst is added to promote the ester interchange reaction.

11. The method of claim 10 wherein the primary constituent of the aromatic polycarbonate is bisphenol A.

12. The method of claim 11 wherein an additive selected from (i) an inorganic and/or organic compound of groups Ia, Ia, IVa, IIb, IVb or Va of the periodic table of elements, or a nitrogen-containing organic basic compound;

(ii) an acid or sulfur-containing acidic compound of pKa less than about 6 and/or a derivative or salt formed from said acidic compound; or, (iii) a stabilizer is added together with the polyester resin.

13. The method of claim 12 wherein the ratio by weight of the constituents of the transparent polyester/polycarbonate composition is from about 45/55 to about 3/97.

* * * * *